United States Patent
Wang et al.

(10) Patent No.: US 11,114,053 B2
(45) Date of Patent: Sep. 7, 2021

(54) ANTI-PEEPING CIRCUIT, DRIVING METHOD THEREOF, AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Xinle Wang, Beijing (CN); Wei Sun, Beijing (CN); Wenchao Han, Beijing (CN); Zhaohui Meng, Beijing (CN); Lianghao Zhang, Beijing (CN); Yilin Feng, Beijing (CN); Xiaoyang Shen, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/632,936

(22) PCT Filed: Jan. 4, 2019

(86) PCT No.: PCT/CN2019/070498
§ 371 (c)(1),
(2) Date: Jan. 22, 2020

(87) PCT Pub. No.: WO2020/140291
PCT Pub. Date: Jul. 9, 2020

(65) Prior Publication Data
US 2021/0074233 A1    Mar. 11, 2021

(51) Int. Cl.
G09G 3/36      (2006.01)
G02F 1/133     (2006.01)
G02F 1/1343    (2006.01)

(52) U.S. Cl.
CPC ....... G09G 3/3677 (2013.01); G02F 1/13306 (2013.01); G02F 1/134309 (2013.01);
(Continued)

(58) Field of Classification Search
CPC ............ G02F 1/1323; G02F 1/133512; G02F 1/1343; G02F 1/134381; H04N 2013/40;
(Continued)

(56) References Cited

U.S. PATENT DOCUMENTS 8,194,016 B2 *   6/2012   Yoshiga .............. G09G 3/3648
                                                   345/87
2008/0272995 A1 * 11/2008 Sakaguchi ........... G06F 1/1637
                                                   345/87
(Continued)

FOREIGN PATENT DOCUMENTS

CN    105807511     *  7/2016  ........... G02F 1/1323
CN    105807511 A      7/2016
(Continued)

Primary Examiner — Duc Q Dinh
(74) Attorney, Agent, or Firm — Leason Ellis LLP

(57) ABSTRACT

An anti-peeping circuit for a display panel, a driving method thereof, and a display device. The anti-peeping circuit includes a waveform generator. The waveform generator is connected to an anti-peeping electrode of the display panel, and the waveform generator is configured to generate an anti-peeping signal and output the anti-peeping signal to the anti-peeping electrode of the display panel.

15 Claims, 4 Drawing Sheets

(52) U.S. Cl.
CPC ..... *G09G 2310/06* (2013.01); *G09G 2310/08* (2013.01); *G09G 2320/068* (2013.01); *G09G 2358/00* (2013.01)

(58) Field of Classification Search
CPC ............... H04N 5/72; G09G 2320/028; G09G 2320/068; G09G 2300/0447; G09G 2300/0426; G09G 3/36; G09G 3/3614; G09G 5/38; G09G 2358/00; G02B 6/0055; G02B 6/0053; G02B 6/0068; G02B 6/0036; G02B 6/0038; G02B 6/0051; G02B 6/0056; G02B 6/0076; G02B 2207/123; G02B 30/26; G02B 5/1828; G02B 5/1871; G02B 6/0023; G02B 26/005; G02B 30/31; G02B 5/003
See application file for complete search history.

(56) References Cited

U.S. PATENT DOCUMENTS

2014/0240627 A1    8/2014   Wu
2019/0206351 A1*   7/2019   Xi ........................ G09G 3/3655

FOREIGN PATENT DOCUMENTS

| CN | 106814483 A | 6/2017 |
| CN | 108873417 A | 11/2018 |

* cited by examiner

ANTI-PEEPING CIRCUIT, DRIVING METHOD THEREOF, AND DISPLAY DEVICE

CROSS-REFERENCE TO RELATED PATENT APPLICATIONS

This application is a U.S. National Stage Application under 35 U.S.C. § 371 of International Patent Application No. PCT/CN2019/070498, filed Jan. 4, 2019, which is incorporated by reference in its entirety.

TECHNICAL FIELD

Embodiments of the present disclosure relate to an anti-peeping circuit for a display panel, a driving method thereof, and a display device.

BACKGROUND

With the development of technologies of the society and the enrichment of material conditions, various electronic devices such as mobile phones, computers, and televisions have played an increasingly indispensable role in daily lives and work. However, while various electronic devices provide many conveniences for people, these electronic devices may also cause problems such as personal information leakage. For example, a display device generally has a relatively large viewing angle, which is a great advantage for public displays; but for individual users, it is not conducive to confidentiality of personal information.

SUMMARY

At least one embodiment of the present disclosure provides an anti-peeping circuit for a display panel, the anti-peeping circuit comprising a waveform generator. The waveform generator is connected to an anti-peeping electrode of the display panel, and the waveform generator is configured to generate an anti-peeping signal and output the anti-peeping signal to the anti-peeping electrode of the display panel.

For example, the anti-peeping circuit according to an embodiment of the present disclosure further comprises a calculating circuit. The calculating circuit is connected to the waveform generator and the anti-peeping electrode, respectively, and the calculating circuit is configured to amplify the anti-peeping signal and output the amplified anti-peeping signal to the anti-peeping electrode.

For example, in the anti-peeping circuit according to an embodiment of the present disclosure, the calculating circuit comprises a first calculating sub-circuit and a second calculating sub-circuit. A first input terminal of the first calculating sub-circuit is connected to an output terminal of the waveform generator to receive the anti-peeping signal, a second input terminal of the first calculating sub-circuit is connected to a reference voltage terminal to receive a reference voltage, and an output terminal of the first calculating sub-circuit is connected to a first input terminal of the second calculating sub-circuit; and a second input terminal of the second calculating sub-circuit is connected to a bias voltage terminal to receive a bias voltage, and an output terminal of the second calculating sub-circuit is connected to the anti-peeping electrode to output the amplified anti-peeping signal.

For example, in the anti-peeping circuit according to an embodiment of the present disclosure, the bias voltage is configured so that a first difference value of the anti-peeping signal is equal to a second difference value of the anti-peeping signal; and the first difference value is a difference value between a first level of the anti-peeping signal and a common voltage, and the second difference value is a difference value between a second level of the anti-peeping signal and the common voltage.

For example, in the anti-peeping circuit according to an embodiment of the present disclosure, the first calculating sub-circuit is a first subtraction sub-circuit, and the second calculating sub-circuit is a second subtraction sub-circuit.

For example, in the anti-peeping circuit according to an embodiment of the present disclosure, the waveform generator comprises a digital-to-analog converter. The digital-to-analog converter is configured to perform digital-to-analog conversion on the anti-peeping signal and output the converted anti-peeping signal from an output terminal of the waveform generator.

For example, in the anti-peeping circuit according to an embodiment of the present disclosure, the waveform generator further comprises an interruption unit configured to control outputting of the anti-peeping signal in a case where a trigger signal is detected, and the trigger signal is provided by a timing controller.

For example, in the anti-peeping circuit according to an embodiment of the present disclosure, the waveform generator further comprises an input terminal, and is configured to receive an instruction for generating the anti-peeping signal.

For example, in the anti-peeping circuit according to an embodiment of the present disclosure, each period of the anti-peeping signal comprises a gradually-changing-level region and a constant-level region.

At least one embodiment of the present disclosure further provides a display device, which comprises the anti-peeping circuit according to at least one embodiment of the present disclosure and a display panel. The display panel comprises an anti-peeping electrode, and the anti-peeping electrode is electrically connected to the anti-peeping circuit.

For example, in the display device according to an embodiment of the present disclosure, the display panel is a liquid crystal display panel, and the anti-peeping electrode is at a displaying side of the liquid crystal display panel and covers at least a display area.

For example, in the display device according to an embodiment of the present disclosure, the liquid crystal display panel comprises: a first substrate, a second substrate opposite to the first substrate, and a liquid crystal layer between the first substrate and the second substrate. The anti-peeping electrode is on the second substrate, and is configured to apply an electrical signal to the liquid crystal layer under a control of the anti-peeping signal output by the anti-peeping circuit.

For example, the display device according to an embodiment of the present disclosure further comprises a timing controller. The timing controller is configured to be connected to the anti-peeping circuit and a gate driving circuit of the display panel to provide a trigger signal.

At least one embodiment of the present disclosure further provides a driving method of a anti-peeping circuit, which comprises: generating the anti-peeping signal by the waveform generator, and inputting the anti-peeping signal to the anti-peeping electrode of the display panel.

For example, in the driving method according to an embodiment of the present disclosure, the anti-peeping circuit further comprises a calculating circuit, and the driving method further comprises: amplifying, by the calculating circuit, the anti-peeping signal generated by the waveform generator, and sending the amplified anti-peeping signal to the anti-peeping electrode of the display panel.

For example, in the driving method according to an embodiment of the present disclosure, the waveform generator comprises an interruption unit, and the driving method further comprises: outputting by the waveform generator the anti-peeping signal to the anti-peeping electrode, in a case where the interruption unit detects a trigger signal.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

Figure 1:
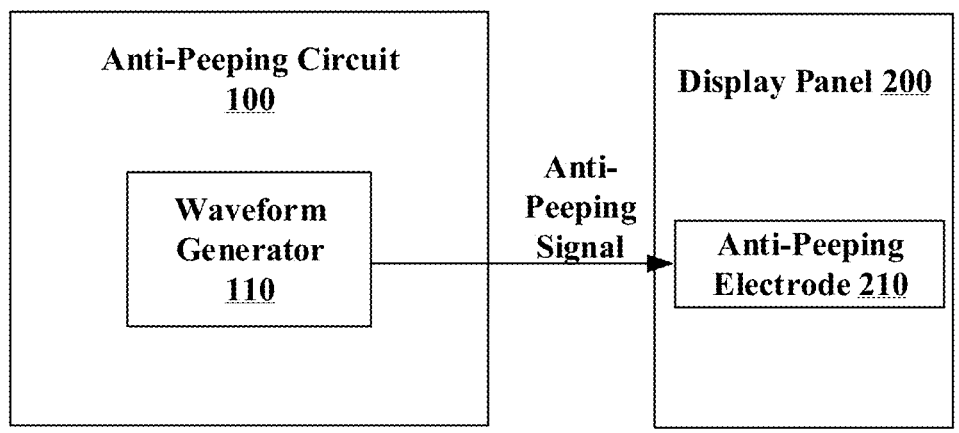
FIG. 1 is a schematic diagram of an anti-peeping circuit provided by some embodiments of the present disclosure.

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The present disclosure is described below through several specific embodiments. In order to keep the following description of the embodiments of the present disclosure clear and concise, detailed descriptions of known functions and known components may be omitted. When any component of an embodiment of the present disclosure appears in more than one drawing, the component is represented by the same or similar reference numeral in each drawing.

With the gradual popularization of New Business (New Business), Internet products such as electronic devices have played an increasingly important role in people's lives. In order to protect the personal information of users when using electronic devices in public places, research on the anti-peeping technology of liquid crystal displays is becoming increasingly important. A common anti-peeping solution is a module anti-peeping solution. For example, a layer of an anti-peeping film can be covered on the display panel to reduce the viewing angle of the display panel, thereby realizing the anti-peeping display. However, such technical solution leads to relatively high costs of the process of technological development. For example, the costs of this technical solution are increased by 58.3% than the original product, and the structure is complex, which reduces the display brightness of the display panel and improves power consumption of the display panel in the anti-peeping display operation, which is not conducive to the promotion and development of anti-peeping technology.

At least one embodiment of the present disclosure provides an anti-peeping circuit for a display panel, and the anti-peeping circuit includes a waveform generator. The waveform generator is connected to an anti-peeping electrode of the display panel, and the waveform generator is configured to generate an anti-peeping signal and output the anti-peeping signal to the anti-peeping electrode of the display panel. At least one embodiment of the present disclosure also provides a display device and a driving method corresponding to the anti-peeping circuit.

The anti-peeping circuit provided by the above embodiments of the present disclosure can effectively reduce the manufacturing costs of the anti-peeping technology, improve the display quality of the display panel, reduce the power consumption of the display panel, and thereby improve the market competitiveness of the anti-peeping product.

The embodiments of the present disclosure and examples thereof will be described in detail below with reference to the drawings.

Figure 2:
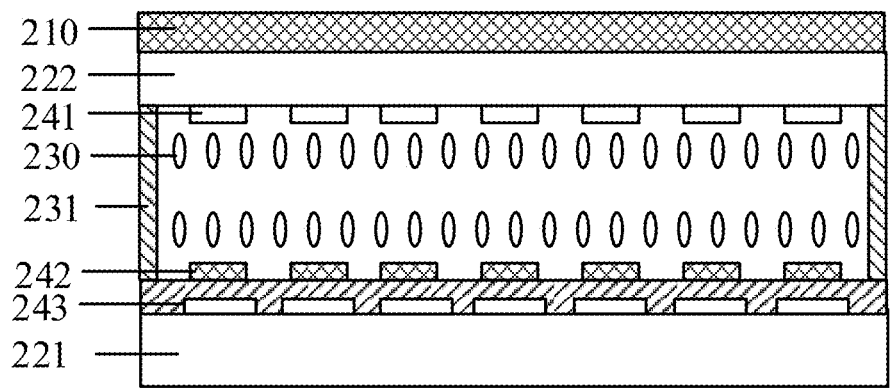
FIG. 2 is a schematic structural diagram of a display panel shown in FIG. 1.

FIG. 1 is a schematic diagram of an anti-peeping circuit provided by some embodiments of the present disclosure, and FIG. 2 is a schematic structural diagram of a display panel shown in FIG. 1. The anti-peeping circuit 100 provided in some embodiments of the present disclosure will be described in detail below with reference to FIGS. 1 and 2.

As shown in FIG. 1, in an example, the anti-peeping circuit 100 includes a waveform generator 110 and the display panel 200 includes an anti-peeping electrode 210. For example, the waveform generator 110 is connected to the anti-peeping electrode 210 of the display panel 200, and is configured to generate an anti-peeping signal and output the generated anti-peeping signal to the anti-peeping electrode 210 of the display panel 200, so as to apply an electric signal to a liquid crystal layer 230 (shown in FIG. 2) in the display panel 200. An electric field generated by the electric signal can control the deflection of the liquid crystal molecules to reduce the display viewing angle of the display panel, thereby realizing anti-peeping display and protecting the privacy of the user. For example, during a debugging process, the waveform generator 110 may be implemented as a development board (for example, an STM32 development board); during mass production, the waveform generator 110 may be directly implemented as an MCU (Micro Controller Unit), such as a single chip microcomputer and the like, which is not limited in the embodiments of the present disclosure. The specific configuration of the waveform generator 110 will be described in detail in the embodiment shown in FIG. 4 below, details of which will not be elaborated here.

For example, the display panel 200 may be a liquid crystal display panel, and however, it may be other display panel, which is not limited in the embodiments of the present disclosure. The display panel 200 will be described as a liquid crystal display panel for example below.

As shown in FIG. 2, the liquid crystal display panel 200 includes an anti-peeping electrode 210, a first substrate 221, a second substrate 222 (for example, a color filter substrate), and a liquid crystal layer 230. The first substrate 221 and the second substrate 222 are disposed opposite to each other to be aligned to each other to form a cell, for example, by using a sealant 231. The liquid crystal layer 230 is disposed between the first substrate 221 and the second substrate 222.

For example, the display panel 200 further includes pixel units arranged in an array. Each pixel unit includes a pixel electrode 242, a common electrode 241, and a thin film transistor 243 connected to the pixel electrode 242. As shown in FIG. 2, the pixel electrode 242 and the thin film transistor 243 connected to the pixel electrode 242 are disposed on the first substrate 221, and the common electrode 241 is disposed on the second substrate 222. In this case, the display panel is, for example, a twisted nematic (TN) type liquid crystal display panel. However, the pixel electrode 242 and the common electrode 241 may also be disposed on the same substrate. In this case, the display panel is, for example, an in-plane switch (IPS) type liquid crystal display panel, a fringe field switch (FFS) type liquid crystal display panel, or an advanced super-dimensional field switch (ADS) type liquid crystal display panel, which is not limited in the embodiments of the present disclosure.

For example, thin film transistors 243 are connected to a gate driving circuit (not shown in the figure) and a data driving circuit (not shown in the figure), and is turned on row by row under the control of gate scan signals provided by the gate driving circuit, so that data signals provided by the data driving circuit are input to the pixel electrodes 242. The pixel electrodes 242 can provide electric signals to the liquid crystal layer 230 under the control of the data signals, so as to control the liquid crystal molecules in the liquid crystal layer 230 to perform corresponding deflection, thereby achieving the corresponding display.

For example, the anti-peeping electrode 210 may be disposed on the displaying side of the display panel 200 (for example, the side where the second substrate 222 is disposed) and at least cover the display area. For example, the anti-peeping electrode 210 is disposed on the second substrate 222 to apply an electrical signal to the liquid crystal layer 230 under the control of the received anti-peeping signal. For example, the anti-peeping electrode 210 may be formed as a surface electrode covering the entire display area. Alternatively, the anti-peeping electrode 210 may be formed as a slit electrode, for example, a slit is formed at a position corresponding to a black matrix of the display panel. For example, the electric field formed by the anti-peeping electrode which applying the electrical signal and, for example, the pixel electrode, can control the liquid crystal molecules to rotate around, for example, their short axis direction so that the viewing angle of the display panel can be reduced, and the anti-peeping display of the display panel can be achieved, so as to protect the privacy of users.

As shown in FIG. 2, the anti-peeping electrode 210 may be arranged laterally along the second substrate 222, and however, it may also be arranged longitudinally along the second substrate 222, which is not limited in the embodiment of the present disclosure. For example, the material of the anti-peeping electrode 210 may be a transparent conductive material. For example, the transparent conductive material may be a material including a transparent metal oxide such as indium tin oxide (ITO) or indium zinc oxide (IZO).

The anti-peeping circuit provided by the above embodiments of the present disclosure does not requiring adhering an anti-peeping film with a complicated structure. The anti-peeping display can be realized only by transmitting the generated anti-peeping signal to the anti-peeping electrode of the display panel, and the required costs are only increased by a small percentage (such as 0.026%) compared with the original product. Therefore, it is possible to effectively reduce the production costs of the anti-peeping technology, improve the display quality of the display panel, and reduce the power consumption of the display panel, thereby increasing the market competitiveness of the anti-peeping product.

Figure 3:
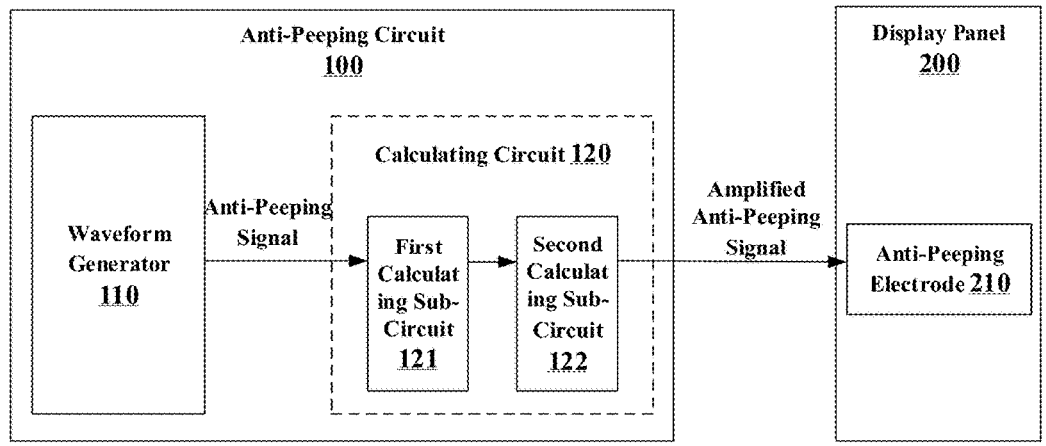
FIG. 3 is a schematic diagram of another anti-peeping circuit provided by some embodiments of the present disclosure.

FIG. 3 is a schematic diagram of another anti-peeping circuit according to an embodiment of the present disclosure. As shown in FIG. 3, based on the example shown in FIG. 1, the anti-peeping circuit 100 further includes a calculating circuit 120. It should be noted that other circuit structures of the anti-peeping circuit 100 shown in FIG. 3 are substantially the same as the anti-peeping circuit 100 shown in FIG. 1, details of which will not be repeated herein.

For example, in some cases, the peak-to-peak value of the anti-peeping signal (a difference between the highest level and the lowest level) of the anti-peeping signal required by the display panel may be above 11V. Generally, the waveform generator 110 (for example, a development board) outputs a relatively low voltage range for example, 0-3.3V. Therefore, the anti-peeping signal output by the waveform generator 110 can be amplified and output to the anti-peeping electrode 210 of the display panel 200, so as to further improve the display quality of the display panel. For example, the process of amplifying the anti-peeping signal can be implemented by the calculating circuit 120.

For example, the calculating circuit 120 is connected to the waveform generator 110 and the anti-peeping electrode 210, and is configured to amplify the anti-peeping signal and output the amplified anti-peeping signal to the anti-peeping electrode 210. For example, as shown in FIG. 3, the calculating circuit 120 includes a first calculating sub-circuit 121 and a second calculating sub-circuit 122. For example, the first calculating sub-circuit 121 is connected to the waveform generator 110 and is configured to perform a first-stage amplification on the anti-peeping signal output by the waveform generator 110 and output the anti-peeping signal after the first-stage amplification to the second calculating sub-circuit 122. For example, the second calculating sub-circuit 122 is respectively connected to the first calculating sub-circuit 121 and the anti-peeping electrode 210 of the display panel 200, and is configured to perform an amplitude adjustment and a second-stage amplification on the anti-peeping signal after the first-stage amplification, and output the resulted anti-peeping signal to the anti-peeping electrode 210 of the display panel 200. For example, the second-stage amplification includes further amplifying the anti-peeping signal after the first-stage amplification, and the amplitude adjustment includes shifting the amplified anti-peeping signal along the Y axis, such as moving up or down, so that the highest and lowest levels of the anti-peeping signal change synchronously to keep the peak-to-peak value unchanged. For example, a negative voltage may be included in the anti-peeping signal through the amplitude adjustment to meet the driving requirement of the display panel. The specific process of the amplitude adjustment will be described in detail in the section relating to the second calculating sub-circuit below, which will not be elaborated here.

For example, the first calculating sub-circuit 121 may be implemented as a first subtraction sub-circuit, the second calculating sub-circuit 122 may be implemented as a second subtraction circuit, and the specific structures of the first calculating sub-circuit 121 and the second calculating sub-circuit 122 will be described in detail in the embodiment shown in FIG. 4 below, and will not be repeated here.

Figure 4:
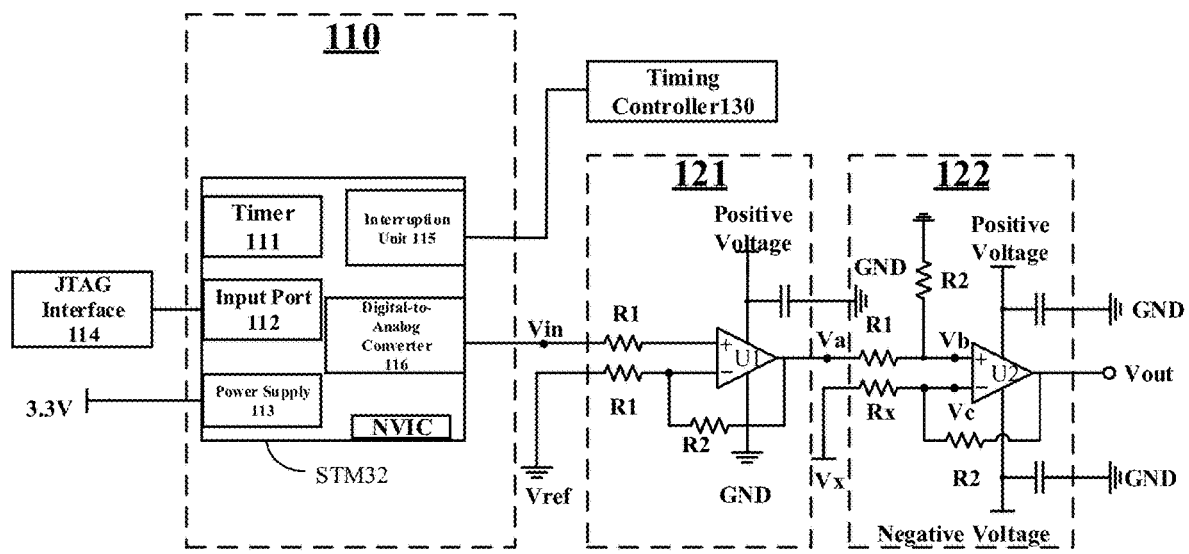
FIG. 4 is a circuit diagram of a specific implementation of the anti-peeping circuit shown in FIG. 3.

FIG. 4 is a schematic circuit diagram of a specific implementation of the anti-peeping circuit shown in FIG. 3. As shown in FIG. 4, the waveform generator 110 can be implemented as an STM32 development board. For example, the STM32 development board may include a timer 111 (Timer), an input port 112 (GPIO), a power supply 113, a digital-to-analog converter 116 (DAC), and an interruption unit 115 (EXIT).

For example, when the STM32 development board is used to generate the anti-peeping signal, related resources on the development board, such as the timer 111 (Timer), the input port 112 (GPIO), the power supply 113, and the digital-to-analog converter 116 (DAC), the interruption unit 115 (EXIT), and the like, require being correspondingly configured (for example, debugging codes/instructions, so that the development board outputs the ideal anti-peeping signal). For example, the development board can be connected to a 3.3V voltage source through the interface at the power supply 113. The JPAG interface 114 is an instruction download interface, having an end connected to a controller (such as a personal computer) through a download cable to receive computer program instructions for generating an anti-peeping signal, and another end connected to the input port 112, so that the instructions for generating the anti-peeping signal is input into the STM32 development board to generate an ideal anti-peeping signal.

For example, the digital-to-analog converter 116 may be configured to perform digital-to-analog conversion on the anti-peeping signal and output the converted signal at the output terminal of the waveform generator 110. For example, the anti-peeping signal generated by the waveform generator 110 is a digital signal, and before the anti-peeping signal is input to the anti-peeping electrode 210 of the display panel 200, for example, when the calculating circuit 120 is included, before the anti-peeping signal is output to the calculating circuit 120, the anti-peeping signal requires being converted into an analog signal by the digital-to-analog converter 116. For example, according to the waveform characteristics of the anti-peeping signal, 128 sampling points may be set to generate a digital anti-peeping signal at the waveform generator 110. It should be noted that the number of sampling points may also be set more or less, and the specific setting manner can be determined according to the actual situation, which is not limited in the embodiments of the present disclosure.

For example, in some cases during the debugging process, the anti-peeping signal generated by the STM32 development board will generate two bright lines when used to drive the display panel to perform anti-peeping display, and such bright lines are caused by sudden voltage changes at rising and falling edges of the anti-peeping signal. For example, it is possible to set the duty cycle of the anti-peeping signal and the frequency of the anti-peeping signal (for example, set the frequency of the anti-peeping signal to 30 Hz, that is, each display phase has only one rising edge and one falling edge), and set both of the rising and falling edges of the anti-peeping signal in the blanking phase of a frame, so that bright lines due to sudden voltage changes at the rising and falling edges can be avoided on the display panel during the display phase. However, the time when the anti-peeping signal enters the anti-peeping electrode of the display panel 200 is random, so that the positions of the rising and falling edges of the anti-peeping signal cannot be determined, and the rising and falling edges of the anti-peeping signal cannot be set in the blanking phase, which causes a great trouble to the problem of bright lines.

For example, in the embodiments of the present disclosure, the interruption unit 115 is configured to control the output of the anti-peeping signal upon detecting a trigger signal STY. For example, the trigger signal STV may be provided by a timing controller (T-con) 130 and configured to control the simultaneous output of the anti-peeping signal and the gate scan signal. Therefore, the interruption unit 115 can be used to determine the time when the anti-peeping signal is input to the anti-peeping electrode 210 of the display panel 200, so as to facilitate setting the rising edge and falling edge of the anti-peeping signal in the blanking phase during the display process. Thereby, the problem of bright lines appearing on the display panel during the display phase is solved.

In an example, the STM32 development board is connected to the timing controller 130. When the interruption unit 115 in the STM32 development board detects the trigger signal STV output by the timing controller 130, the interruption unit 115 controls the anti-peeping signal to be output to the anti-peeping electrode 210 of the display panel 200, thereby applying an electric signal for anti-peeping to the liquid crystal layer 230. Meanwhile, the timing controller 130 is also connected to a gate driving circuit in the display panel 200 to provide a trigger signal STV and a clock signal, and so on. For example, the gate driving circuit starts to output the gate scan signal row by row under the control of the trigger signal STV to turn on the thin film transistors 243 shown in FIG. 2 row by row, thereby writing the data signals generated by the data driving circuit into the pixel electrodes 242 to apply electric signals for display to the liquid crystal layer 230. Therefore, through the interruption unit 115 and the trigger signal STV, the anti-peeping signal and the gate scan signal can be synchronized, so that the output time of the anti-peeping signal can be determined, and the rising and falling edges thereof can be set in the blanking phase to solve the problem of bright lines appearing on the display panel during the display phase.

For example, as shown in FIG. 4, the first calculating sub-circuit 121 has a first input terminal Vin connected to the output terminal of the STM32 development board to receive an anti-peeping signal (an anti-peeping signal after digital-to-analog conversion), a second input terminal connected to a reference voltage terminal Vref to receive a reference voltage, and an output terminal Va connected to a first input terminal of the second calculating sub-circuit 122. For example, the reference voltage terminal Vref may be grounded, that is, connected to the ground terminal GND.

For example, as shown in FIG. 4, the second calculating sub-circuit 122 has a second input terminal connected to a bias voltage terminal Vx to receive a bias voltage, and an output terminal Vout connected to the anti-peeping electrode 210 (as shown in FIG. 3) to output the amplified anti-peeping signal.

For example, in the first operational circuit 121, a resistance across an inverting input terminal and an output terminal Va of an operational amplifier U1 is R2, a resistance between a second input terminal Vref and the inverting input terminal of the operational amplifier U1 is R1, and a resistance between the first input terminal Vin of the first operational circuit 121 and a non-inverting input terminal of the operational amplifier U1 is R1, so that a voltage gain A1 of the first calculating sub-circuit 121 can be expressed as: A1=1+R2/R1. For example, in the embodiment of the present disclosure, R2=2R and R1=R may be selectively set. Therefore, the voltage of the output terminal Va of the first calculating sub-circuit 121 is:

$$Va=(1+R2/R1)*Vin=3Vin.$$

For example, in the second calculating sub-circuit 122, a resistance across an inverting input terminal Vc and an output terminal Vout of an operational amplifier U2 is R2, a resistance between a first input terminal (that is, the output terminal Va of the first calculating sub-circuit 121) and a non-inverting input terminal Vb of the operational amplifier U2 is R1, and a resistance between the non-inverting input terminal Vb of the operational amplifier U2 and the ground terminal GND is R2. Then, the voltage at the non-inverting input terminal Vb of the operational amplifier U2 of the second calculating sub-circuit 122 may be expressed as:

$$Vb=(R2/(R1+R2))*Va.$$

Since the inverting input terminal Vc and the non-inverting input terminal Vb of the operational amplifier U2 form a virtual break, Vb=Vc.

For example, in the embodiment of the present disclosure, if R2=2R and R1=Rx=R are selectively set, the voltage at the output terminal Vout of the second calculating sub-circuit 122 can be obtained according to the formula (Vout−Vc)/R2=(Vc−Vx)/R1:

$$Vout=3Vc-2Vx.$$

Since the inverting input terminal Vc and the non-inverting input terminal Vb of the operational amplifier U2 form a virtual break, Vb=Vc=2/3Va, and Va=(1+R2/R1) Vin=3Vin, which can be substituted into the above formula to obtain:

$$Vout=3Vc-2Vx=6Vin-2Vx$$

Therefore, it can be seen from the above formula that after the first calculating sub-circuit 121 and the second calculating sub-circuit 122, the waveform of the anti-peeping signal output by the STM32 development board is amplified by 6 times, for example, and the amplitude can be shifted downward by 2Vx.

For example, the bias voltage Vx may make a first difference value of the anti-peeping signal equal to a second difference value of the anti-peeping signal. For example, the first difference value is a difference value between a first level (e.g., a high level) of the anti-peeping signal and a common voltage, and the second difference value is a difference value between a second level (e.g., a low level) of the anti-peeping signal and the common voltage. Since the high and low levels of the anti-peeping signal require having the same voltage difference from the common voltage (for example, the amplitude of the high level is equal to the amplitude of the low level), the low level voltage in the anti-peeping signal is required to be a negative voltage. However, the voltage of the anti-peeping signal output by the STM32 development board is, for example, 0-3.3V, and the amplified voltage is also a positive voltage, therefore it is necessary to add a bias voltage (e.g., −2Vx) to get the ideal anti-peeping signal, to obtain an anti-peeping signal including a negative voltage, thereby achieving the amplitude adjustment.

For example, the operational amplifiers U1 and U2 shown in FIG. 4 may be selected as OPA551 S0-8 (U). However, other types of operational amplifiers may be used in different embodiments of the present disclosure, which is not limited in the embodiment of the present disclosure.

It should be noted that in the embodiment of the present disclosure, Vref may represent both of the reference voltage terminal and the reference voltage, Vx may represent both of the bias voltage terminal and the bias voltage, and Vout may represent the output terminal of the second calculating sub-circuit 122 and may also indicate the output voltage . . . . The rest of the voltage terminals are similar and will not be repeated here.

Figure 5:
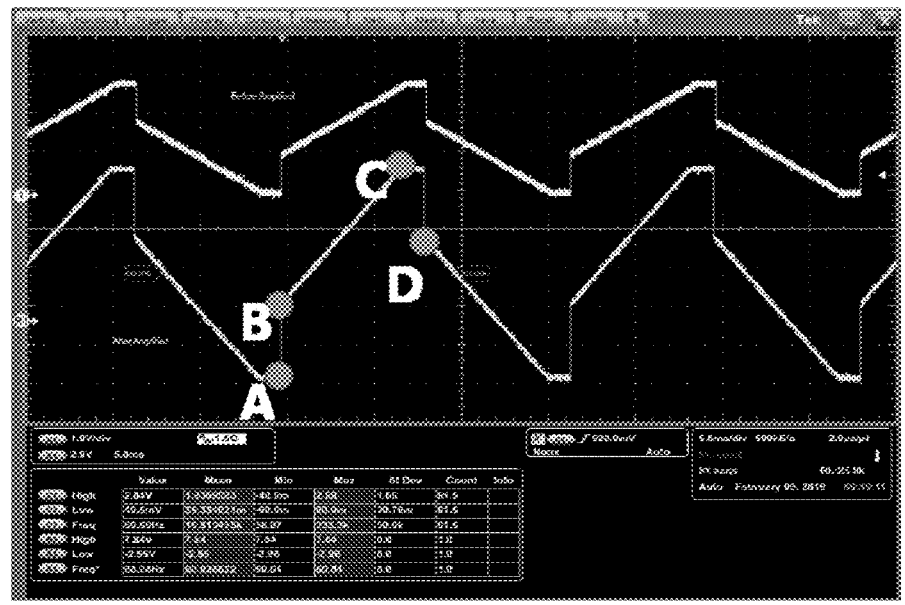
FIG. 5 is a timing diagram of an example of an anti-peeping signal generated by the anti-peeping circuit shown in FIG. 4.

FIG. 5 is a timing diagram of an example of an anti-peeping signal generated by the anti-peeping circuit shown in FIG. 4. For example, each period of the anti-peeping signal includes a gradually-changing-level region (for example, the level between points B and C) and a constant-level region (for example, the levels of points C and D in the horizontal direction), such a waveform design makes the brightness of the display panel gradually change, there will be no notable brightness difference, so it is possible to solve the mura phenomenon caused by the load of the display panel. For example, the brightness of the backlight region can also be adjusted on this basis to further weaken the mura phenomenon.

For example, the waveform of the anti-peeping signal may be an AC voltage. For example, in the timing sequence of the anti-peeping signal, the theoretical value of the voltage at each point on the straight line BC can be calculated based on the voltage slope. It should be noted that in an application, the voltages and bias voltages at the points A, B, C, and D are based on the actual measured values and are corrected based on the theoretical values. For example, after obtaining the actual voltage Vi at each point of A, B, C, and D in the anti-peeping signal (i represents A, B, C, or D), the value Q in the computer program instructions can be obtained through the specific calculation as follows:

$$Q=(Vi*F)/(peak-to-peak*T)$$

For example, F represents a frequency of the crystal oscillator, for example, F=4096; peak-to-peak (pk-pk) represents the difference between the highest level and the lowest level of the anti-peeping signal generated by the anti-peeping circuit 100; and T represents the amplification gain of the calculating circuit 120, for example, the amplification gain T=6 in FIG. 4.

Figure 6:
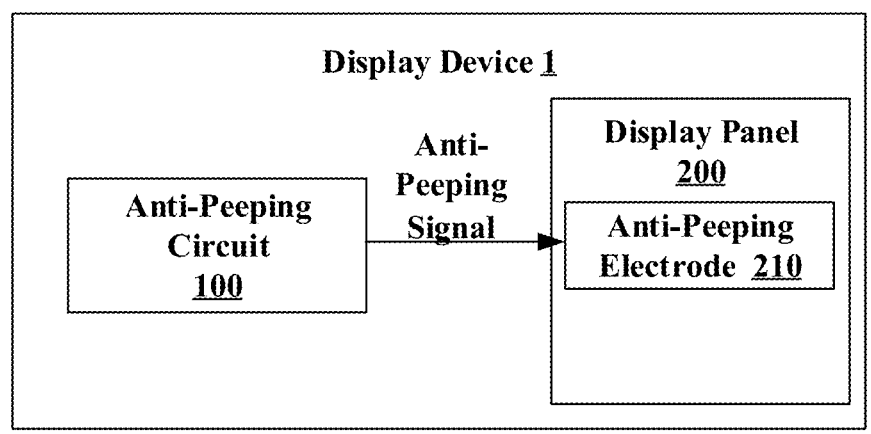
FIG. 6 is a schematic diagram of a display device provided by some embodiments of the present disclosure.
Figure 7:
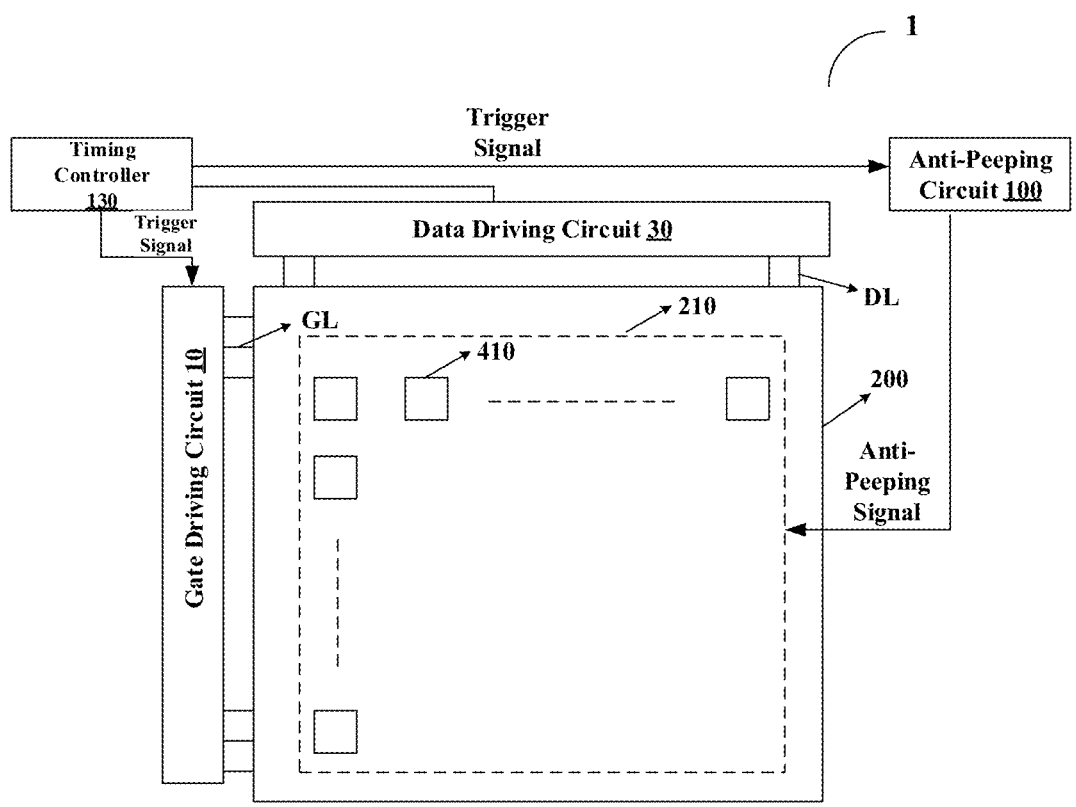
FIG. 7 is a schematic diagram of another display device provided by some embodiments of the present disclosure.

An embodiment of the present disclosure further provides a display device, which can perform anti-peeping display. FIG. 6 is a schematic diagram of a display device provided by an embodiment of the present disclosure, and FIG. 7 is a schematic diagram of another display device provided by an embodiment of the present disclosure. The display device 1 provided by the embodiment of the present disclosure is described in detail below with reference to FIGS. 6 and 7.

As shown in FIGS. 6 and 7, the display device 1 includes an anti-peeping circuit 100 and a display panel 200. For example, the anti-peeping circuit 100 may adopt the anti-peeping circuit provided by any embodiment of the present disclosure. For example, the anti-peeping circuit shown in FIG. 4 may be adopted. For example, the display panel 200 includes an anti-peeping electrode 210 that is electrically connected to the anti-peeping circuit 200 to receive an anti-peeping signal.

For example, the display panel 200 is a liquid crystal display panel, and the anti-peeping electrode 210 is disposed on the displaying side of the liquid crystal display panel and covers at least the display area. For example, as shown in FIG. 2, the liquid crystal display panel includes a first substrate 221, a second substrate 222 opposite to the first substrate 221, and a liquid crystal layer 230 disposed between the first substrate 221 and the second substrate 222. For example, the anti-peeping electrode 210 is disposed on the second substrate 222 and is configured to apply an electrical signal to the liquid crystal layer 230 under the control of the anti-peeping signal output by the anti-peeping circuit 100.

For example, as shown in FIG. 2, FIG. 6, and FIG. 7, the display panel 200 further includes pixel units 410 arranged in an array, a gate driving circuit 10, and a data driving circuit 30 (i.e., a source driving circuit). Each of the pixel units includes, for example, a pixel electrode 242, a common electrode 241, and a thin film transistor 243 connected to the pixel electrode 242, as shown in FIG. 2. The gate driving circuit 10 is implemented, for example, as a GOA directly prepared on the first substrate 221, or is implemented as a gate driving chip which mounted on the first substrate 221 by a bonding method; the data driving circuit 30 may be directly prepared, for example, on the first substrate 221 or implemented as a data driving chip which is mounted on the first substrate 221 by a bonding method. For example, the thin film transistors 243 are connected to the gate driving circuit 10 and the data driving circuit 30, and are turned on row by row under the control of the gate scan signals provided by the gate driving circuit 10, thereby inputting the data signals provided by the data driving circuit 30 to the pixel electrodes 242. The pixel electrode 242 can provide an electric signal to the liquid crystal layer 230 under the control of the data signal, so as to control the liquid crystal molecules in the liquid crystal layer 230 to perform corresponding deflection and achieve corresponding display.

For example, as shown in FIG. 7, the display device 1 further includes a timing controller 130, and the timing controller 130 is connected to the anti-peeping circuit 100, the gate driving circuit 10, and the data driving circuit 30, and is configured to send trigger signals to the anti-peeping circuit 100 and the gate driving circuit 10 respectively to control the simultaneous output of the gate scan signal and the anti-peeping signal, so as to control the positions of the rising and falling edges of the anti-peeping signal (for example, set them in the Blanking phase for displaying one frame) to eliminate the bright lines generated by the display panel during the display phase. For the specific process, reference can be made to the description of the interruption unit 115 shown in FIG. 4. For example, when the interruption unit 115 (as shown in FIG. 4) in the anti-peeping circuit 100 detects the trigger signal STV output by the timing controller 130, the interruption unit 115 controls the anti-peeping signal generated by the anti-peeping circuit 100 to be output to the anti-peeping electrode 210 of the display panel 200. Meanwhile, when the gate driving circuit 10 in the display panel 200 detects the trigger signal STV, the gate driving circuit 10 starts to output the gate scan signal row by row to turn on the thin film transistors 243 as shown in FIG. 2 row by row, so as to write the data signals generated by the driving circuit 30 into the pixel electrodes 242 to control the deflection of the liquid crystal molecules in the liquid crystal layer 230.

For example, the liquid crystal molecules in the liquid crystal layer 230 are deflected by the superposition of the electric field applied by the anti-peeping electrode 210 and the electric field applied by the pixel electrodes 242 and the common electrodes 241, which can reduce the viewing angle of the display panel and realize the anti-peeping display, so as to achieve the protection of the privacy of the user.

An embodiment of the present disclosure may also provide a driving method of an anti-peeping circuit. For example, the driving method may be configured to drive the anti-peeping circuit 100 shown in FIG. 1 or FIG. 3 to generate an anti-peeping signal. The anti-peeping signal may be used to apply an electric signal to the liquid crystal layer of the display panel, thereby realizing the anti-peeping display.

For example, in an example, the driving method of the anti-peeping circuit includes generating an anti-peeping signal by the waveform generator 110 and inputting the anti-peeping signal to the anti-peeping electrode 210 of the display panel 200.

For example, in another example, the anti-peeping circuit 100 further includes a calculating circuit 120, and the driving method further includes: amplifying by the calculating circuit 120 the anti-peeping signal generated by the waveform generator 110, and outputting the amplified anti-peeping signal to the anti-peeping electrode 210 of the display panel 200.

For example, in another example, the waveform generator 110 may further include an interruption unit 115, and the driving method includes: outputting by the waveform generator 110 an anti-peeping signal to the anti-peeping electrode 210, in a case where the interruption unit 115 detects a trigger signal.

For technical effects of the driving method of the anti-peeping circuit 100 provided by the embodiments of the present disclosure, reference may be made to the corresponding descriptions of the anti-peeping circuit 100 in the foregoing embodiments, details of which will not be repeated herein.

The following statements should be noted:

(1) The accompanying drawings involve only the structure(s) in connection with the embodiment(s) of the present disclosure, and other structure(s) can be referred to common design(s).

(2) In case of no conflict, features in embodiments or the embodiments of the present disclosure can be combined to obtain new embodiments.

What are described above is related to the illustrative embodiments of the disclosure only and not limitative to the scope of the disclosure; the scopes of the disclosure are defined by the accompanying claims.

What is claimed is:

1. An anti-peeping circuit for a display panel, the anti-peeping circuit comprising a waveform generator,
wherein the waveform generator is connected to an anti-peeping electrode of the display panel, and the waveform generator is configured to generate an anti-peeping signal and output the anti-peeping signal to the anti-peeping electrode of the display panel; and a calculating circuit, wherein the calculating circuit is connected to the waveform generator and the anti-peeping electrode, respectively, and the calculating circuit is configured to amplify the anti-peeping signal and output the amplified anti-peeping signal to the anti-peeping electrode, wherein the calculating circuit comprises a first calculating sub-circuit and a second calculating sub-circuit;

the first calculating sub-circuit comprises a first input terminal, a second input terminal and a first output terminal, the second calculating sub-circuit comprises a third input terminal, a fourth input terminal and a second output terminal, the first input terminal of the first calculating sub-circuit is connected to an output terminal of the waveform generator to receive the anti-peeping signal, the second input terminal of the first calculating sub-circuit is connected to a reference voltage terminal to receive a reference voltage, and the first output terminal of the first calculating sub-circuit is connected to the third input terminal of the second calculating sub-circuit; and the fourth input terminal of the second calculating sub-circuit is connected to a bias voltage terminal to receive a bias voltage, and the second output terminal of the second calculating sub-circuit is connected to the anti-peeping electrode to output the amplified anti-peeping signal.

2. The anti-peeping circuit according to claim 1, wherein the first calculating sub-circuit is a first subtraction sub-circuit, and the second calculating sub-circuit is a second subtraction sub-circuit.

3. The anti-peeping circuit according to claim 1, wherein the waveform generator comprises a digital-to-analog converter; and the digital-to-analog converter is configured to perform digital-to-analog conversion on the anti-peeping signal and output the converted anti-peeping signal from an output terminal of the waveform generator.

4. The anti-peeping circuit according to claim 1, wherein the waveform generator further comprises an interruption unit configured to control outputting of the anti-peeping signal in a case where a trigger signal is detected, and the trigger signal is provided by a timing controller.

5. The anti-peeping circuit according to claim 1, wherein the waveform generator further comprises an input terminal, and is configured to receive an instruction for generating the anti-peeping signal.

6. The anti-peeping circuit according to claim 1, wherein each period of the anti-peeping signal comprises a gradually-changing-level region and a constant-level region.

7. The anti-peeping circuit according to claim 1, wherein the bias voltage is configured so that a first difference value of the anti-peeping signal is equal to a second difference value of the anti-peeping signal; and the first difference value is a difference value between a first level of the anti-peeping signal and a common voltage, and the second difference value is a difference value between a second level of the anti-peeping signal and the common voltage.

8. The anti-peeping circuit according to claim 7, wherein the first calculating sub-circuit is a first subtraction sub-circuit, and the second calculating sub-circuit is a second subtraction sub-circuit.

9. The anti-peeping circuit according to claim 7, wherein the waveform generator comprises a digital-to-analog converter; and the digital-to-analog converter is configured to perform digital-to-analog conversion on the anti-peeping signal and output the converted anti-peeping signal from the output terminal of the waveform generator.

10. A display device, comprising the anti-peeping circuit according to claim 1 and a display panel, wherein the display panel comprises an anti-peeping electrode, and the anti-peeping electrode is electrically connected to the anti-peeping circuit.

11. The display device according to claim 10, wherein the display panel is a liquid crystal display panel, and the anti-peeping electrode is at a displaying side of the liquid crystal display panel and covers at least a display area.

12. The display device according to claim 11, wherein the liquid crystal display panel comprises: a first substrate, a second substrate opposite to the first substrate, and a liquid crystal layer between the first substrate and the second substrate; and the anti-peeping electrode is on the second substrate, and is configured to apply an electrical signal to the liquid crystal layer under a control of the anti-peeping signal output by the anti-peeping circuit.

13. The display device according to claim 10, further comprising a timing controller, wherein the timing controller is configured to be connected to the anti-peeping circuit and a gate driving circuit of the display panel to provide a trigger signal.

14. A driving method of an anti-peeping circuit for a display panel, the anti-peeping circuit comprising a waveform generator, wherein the waveform generator is connected to an anti-peeping electrode of the display panel, and the waveform generator is configured to generate an anti-peeping signal and output the anti-peeping signal to the anti-peeping electrode of the display panel, and the driving method comprises:

generating the anti-peeping signal by the waveform generator, and inputting the anti-peeping signal to the anti-peeping electrode of the display panel, and the anti-peeping circuit further comprises a calculating circuit, and the driving method further comprises: amplifying, by the calculating circuit, the anti-peeping signal generated by the waveform generator; and sending the amplified anti-peeping signal to the anti-peeping electrode of the display panel, wherein the calculating circuit comprises a first calculating sub-circuit and a second calculating sub-circuit, the first calculating sub-circuit comprises a first input terminal, a second input terminal and a first output terminal, the second calculating sub-circuit comprises a third input terminal, a fourth input terminal and a second output terminal, the first input terminal of the first calculating sub-circuit is connected to an output terminal of the waveform generator to receive the anti-peeping signal, the second input terminal of the first calculating sub-circuit is connected to a reference voltage terminal to receive a reference voltage, and the first output terminal of the first calculating sub-circuit is connected to the third input terminal of the second calculating sub-circuit; and the fourth input terminal of the second calculating sub-circuit is connected to a bias voltage terminal to receive a bias voltage, and the second output terminal of the second calculating sub-circuit is connected to the anti-peeping electrode to output the amplified anti-peeping signal.

15. The driving method according to claim 14, wherein the waveform generator comprises an interruption unit, and the driving method further comprises:
outputting by the waveform generator the anti-peeping signal to the anti-peeping electrode, in a case where the interruption unit detects a trigger signal.

* * * * *